United States Patent [19]

Nishiguma et al.

[11] Patent Number: 5,126,988
[45] Date of Patent: Jun. 30, 1992

[54] OPTICAL HEAD STRUCTURE

[75] Inventors: Hiroaki Nishiguma; Hidekazu Hoshino, both of Kanagawa, Japan

[73] Assignee: NHK Spring Co., Ltd., Kanagawa, Japan

[21] Appl. No.: 399,710

[22] Filed: Aug. 25, 1989

[30] Foreign Application Priority Data

| May 22, 1989 [JP] | Japan | 1-128462 |
| May 25, 1989 [JP] | Japan | 1-131976 |
| May 25, 1989 [JP] | Japan | 1-131977 |

[51] Int. Cl.⁵ .............................. G11B 7/00
[52] U.S. Cl. ................... 369/44.41; 369/44.42; 369/44.23; 369/44.24; 369/44.14
[58] Field of Search .......... 369/44.41, 44.42, 44.23, 369/44.24, 44.14, 116, 121, 135, 112, 110, 111

[56] References Cited

U.S. PATENT DOCUMENTS

| 4,881,216 | 11/1989 | Deguchi et al. | 369/54 |
| 4,920,527 | 4/1990 | Maeda | 369/45 |
| 4,929,823 | 5/1990 | Kato et al. | 250/201.5 |

FOREIGN PATENT DOCUMENTS 0156536 7/1986 Japan ............................. 369/44.41

Primary Examiner—Roy N. Envall, Jr.
Assistant Examiner—Robert Chevalier
Attorney, Agent, or Firm—Baker & Daniels

[57] ABSTRACT

An optical head structure, comprising: a light source; an optical system for projecting a first light beam from the light source upon an optical data recording medium and guiding a second light beam produced from the optical data recording medium as a result of projecting the first light beam, as a converging light beam; a light detecting element having at a photoelectric surface area divided into at least three surface parts, consisting of a central band part extending centrally and diametrally across the surface area and a pair of adjoining outer parts which are arranged on either side of the central band part, to receive the second light beam at a position in a path of the second light beam slightly displaced from a focal point of the second light beam; and a subtracter for producing a difference between an output from the central band part and a sum of outputs of the adjoining parts; the central band part being progressively narrower as it extends away from a central part of the photoelectric surface area. Thus, the sensitivity of focal error detection can be improved, and a desired linearity can be attained in the focal error detection property.

10 Claims, 7 Drawing Sheets 5,126,988

OPTICAL HEAD STRUCTURE

TECHNICAL FIELD

The present invention generally relates to an optical head structure for detecting a focusing error and/or a tracking error of an optical head by using a converging light beam.

BACKGROUND OF THE INVENTION

According to a conventional high density data recording system, a converging light beam is projecting upon a recording medium such an optical disk, and desired data are retrieved by digitally processing the reflected light therefrom. According to a certain rewritable optical disk system which may be called magnetic optical disk system, an optical polarization property of each selected point of the optical disk is altered by heating it beyond the Curie point by projecting a laser beam thereon. This is called the Kerr effect. The local differences in the optical polarization property of the optical disk which are produced in this way to store desired data are detected by an optical head to read out the data therefrom.

In such optical disks, a certain eccentricity and a surface waviness are inevitable. An eccentricity of the optical disk is perceived as a tracking error by the optical head which is required to follow a selected one of tracks to read a set of data. A surface waviness is perceived as a focusing error by the optical head which is required to project a sufficiently focused light upon the desired point on the optical disk. Any failure to control the tracking error and the focusing error will result in unfavorable data read-out errors.

There have been proposed a number of methods for achieving a desired focusing control of an optical head, but most of them either required complicated structures and large number of component parts or are only capable of achieving limited error detection sensitivities. Another problem of the prior art focusing control systems is that they have demonstrated substantially non-linear error detection properties in detecting out-of-focus states and, hence, a desired high-speed control response cannot be attained without creating the problems of control instability.

BRIEF SUMMARY OF THE INVENTION

In view of such problems of the prior art, a primary object of the present invention is to provided an optical head structure which is capable of detecting a focusing error at high sensitivity.

A second object of the present invention is to provide an optical head structure which has a highly linear focusing error detection property.

A third object of the present invention is to provide such an optical head structure which is simple in structure.

These and other objects of the present invention can be accomplished by providing: an optical head structure, comprising: a light source; an optical system for projecting a first light beam from the light source upon an optical data recording medium and guiding a second light beam produced from the optical data recording medium as a result of projecting the first light beam, as a converging light beam; a light detecting element having a photoelectric surface area divided into at least three surface parts, consisting of a central band part extending centrally and diametrally across the surface area and a pair of adjoining outer parts which are arranged on either side of the central band part, to receive the second light beam at a position in a path of the second light beam slightly displaced from a focal point of the second light beam; and a subtracter for producing a difference between an output from the central band part and a sum of outputs of the adjoining parts; the central band part being progressively narrower as it extends away from a central part of the photoelectric surface area. Thus, the sensitivity of focal error detection can be improved using an extremely simple structure. By defining the central band part by appropriately curved lines which may be either concave or convex towards a central part of the central band part, a desired linearity can be attained in the focal error detection property.

According to a particularly preferred embodiment of the present invention, the photoelectric surface area of the light detecting element is divided into six parts by a central diametral line extending centrally across the central band part and the adjoining parts so as to divide each of them into equal parts, and a subtracter is connected to the six parts so as to produce a different between outputs from the parts on one side of the central diametral line and the other parts on the other side of the central diametral line so that outputs required for focusing error control, tracking error control and data read-out can be obtained from a highly compact and simplified optical head unit. Optionally, the diametral line may divide only the central band parts so that the entire photoelectric surface area of the light detecting unit may be divided into four parts. This embodiment permits the use of a simpler detecting circuit.

According to a preferred embodiment of the present invention, to ensure accurate monitoring of the intensity of the first light beam without interfering with the operation of the optical head, the optical system comprises means for producing a light monitoring output for monitoring the intensity of the first beam, and monitoring means for monitoring the light monitoring output, the monitoring means being provided with an input surface which is inclined relative to a plane perpendicular to the line of the path of the light monitoring output.

For obtaining optimum results in terms of detection sensitivity, immunity from external interferences, and linearity in the output property, it is preferred to use a push-pull arrangement in which the optical system is provided with means for splitting the second light beam into a pair of split light beams, and a pair of optical detecting elements are disposed in respective positions in the paths of the split light beams split from the second light beam which are short of and ahead of associated focal points of the split light beams, respectively, by a same distance.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS.

Figure 1:
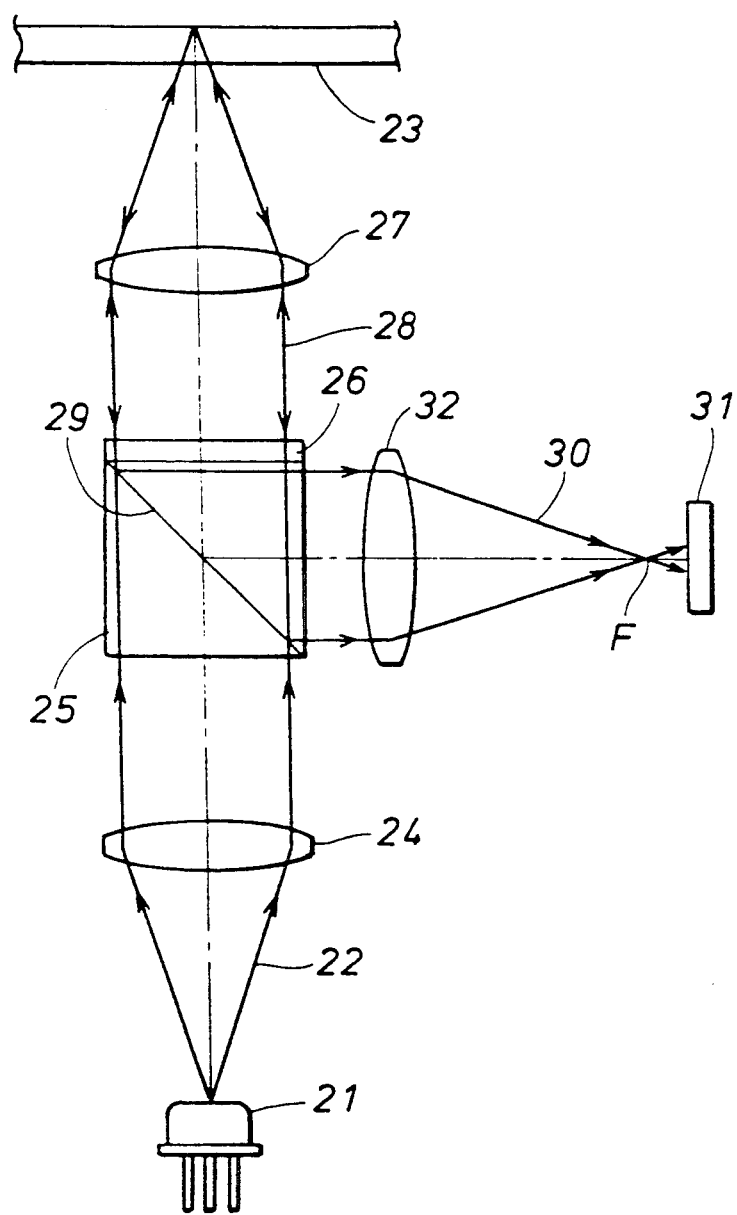
FIG. 1 is a schematic diagram illustrating the principles of an embodiment of the optical head structure according to the present invention.

FIG. 1 shows the basic principles of the optical head structure according to the present invention by taking an example of a normal optical disk system. A light beam 22 produced from a semiconductor laser device 21 illustrated in a lower part of the drawing is projected upon the surface of an optical disk 23 illustrated in an upper part of the drawing, via a collimator lens 24, a polarized beam splitter 25, a quarter-wave plate 26, and an object lens 27. The light beam 28 reflected from the optical disk 23 again passes through the object lens 27, and the quarter-wave plate 26 in the reverse order. As the light beam passes through the quarter-wave plate 26 twice, its plane of polarization is twisted by 90 degrees. Therefore, the reflected light beam 28 is reflected by a polarization film 29 provided in the polarized beam splitter 25, and this reflected light beam 30 is projected upon a light detecting element 31 via a condenser lens 32.

Since the focal point F of the light beam 30 is located a certain distance short of the surface of the light detecting element 31, a light spot of a certain diameter is projected on the surface of the light detecting element 31.

Figure 19:
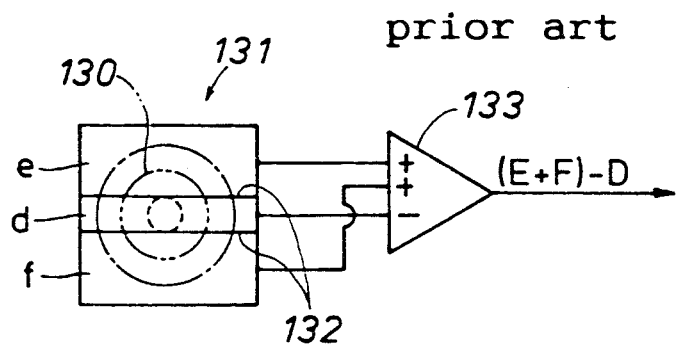
FIG. 19 is a view similar to FIG. 2 illustrating the configuration of a conventional light detecting element and a circuit diagram of its detection circuit.

Now, according to a conventional light detecting element 131 shown in FIG. 19, the light receiving surface of the light detecting element 131 is divided into three parts d, e and f by a pair of parallel lines 132, and the center line of the middle part d of the light receiving surface of the light detecting element 131 coincides with the center of the light beam which is projected thereon. The output D of the middle part d is connected to the inverting input of an amplifier 133 while the outputs E and F of the outer parts e and f are connected to the non-inverting inputs of the amplifier 133.

Thus, when the optical disk 23 is at a neutral position, the light spot 130 on the light receiving surface is projected equally upon the middle part d and the outer parts e and f, and the output D from the middle part d becomes equal to the sum of the outputs E and F from the outer parts e and f. If the optical disk 23 is deviated from its neutral position away from the object lens 27, the light spot formed on the light receiving surface of the light detecting element 131 becomes larger, and the sum of the outputs from the outer parts e and f becomes larger than the output from the middle part d, and a positive output is produced from the amplifier 133. On the other hand, if the optical disk 23 is deviated from its neutral position towards the object lens 27, the light spot formed on the light receiving surface of the light detecting element 131 becomes smaller, and the sum of the outputs from the outer parts e and f becomes smaller than the output from the middle part d, and a negative output is produced from the amplifier 133. According to this conventional arrangement, the detecting sensitivity is not very high and there is a certain nonlinearity in the relationship between the size of the light spot projected on the light receiving surface and the output level from the amplifier 133 as shown by the chain-dot line in FIG. 3.

Figure 2:
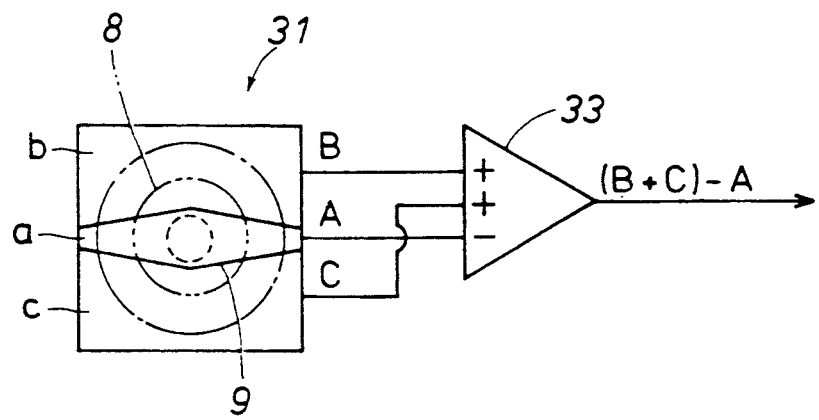
FIG. 2 is a schematic diagram illustrating the configuration of the light detecting element according to the present invention and a circuit diagram of its detection circuit.
Figure 3:
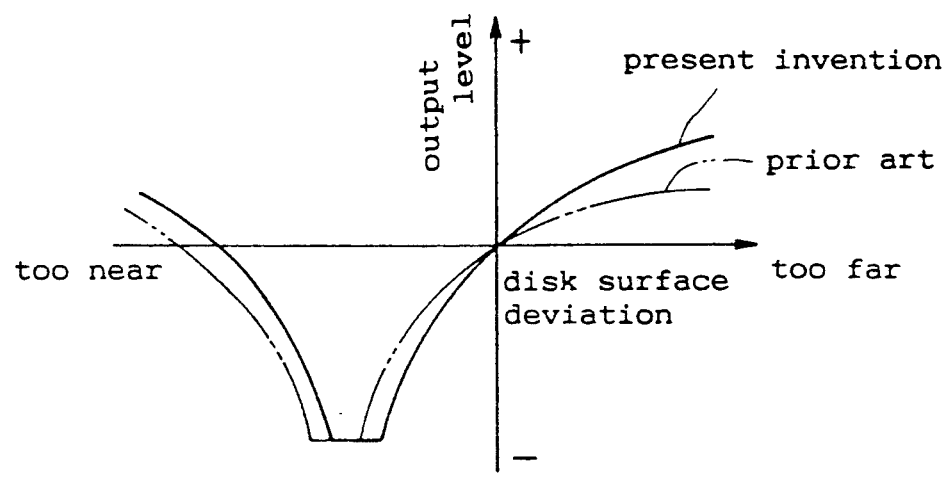
FIG. 3 is a graph showing the relationship between the output level and the size of the light beam projected upon the light detecting element.

FIG. 2 illustrates the arrangement of the different parts a, b and c of the light receiving surface of the light detecting element 31 according to the present invention. According to this embodiment of the present invention, the middle part a is defined by a pair of lines 9 which converge toward each other as the distance from the center increases. Hence, according to this embodiment, the rate of the increase of the outputs B and C from the outer parts b and c for a given increase in the size of the light spot is higher than that of the prior art illustrated in FIG. 19. Therefore, the relationship between the size of the light spot on the light receiving surface and the output from the amplifier $(B+C)-A$ is represented by a solid line curve having a larger inclination angle than the chain-dot line curve as shown in FIG. 3.

Figure 4:
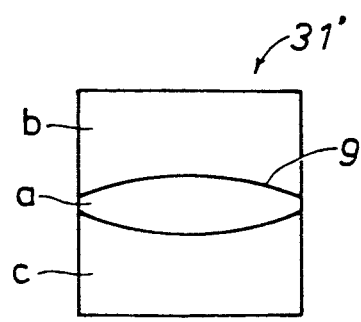
FIG. 4 is a front view of a modified embodiment of the light detecting element according to the present invention.
Figure 5:
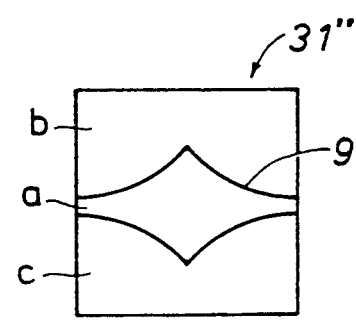
FIG. 5 is a front view of another modified embodiment of the light detecting element according to the present invention.

FIGS. 4 and 5 show alternate embodiments of the arrangements of the different parts a, b and c of the light receiving surfaces of the light detecting elements 31' and 31". In the embodiment illustrated in FIG. 4, the middle part a is defined by a pair of lines 9 which are concave towards the middle part a. In the embodiment illustrated in FIG. 5, the middle part a is defined by four line sections 9 which are convex towards the middle part a, defining a cusp at the central part where each pair of adjoining lines meet. According to these embodiments, it is possible to control not only the inclination of the slope of the curve representing the relationship between the size of the light spot and the output from the light detecting element but also the curvature of the curve thereby allowing to achieve a desired level of linearity in the output property of the light detecting element.

Figure 6:
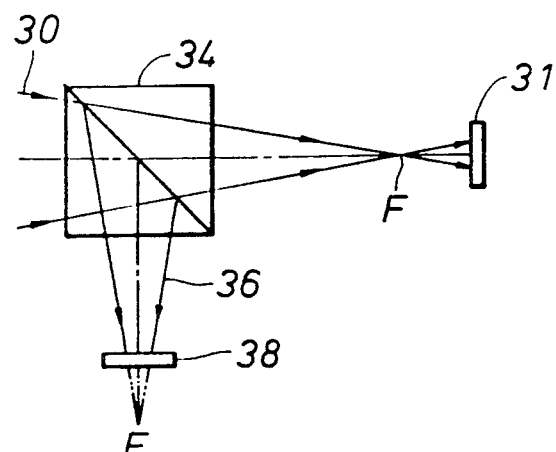
FIG. 6 is a diagram illustrating an essential part of a second embodiment of the optical head structure according to the present invention.
Figure 7:
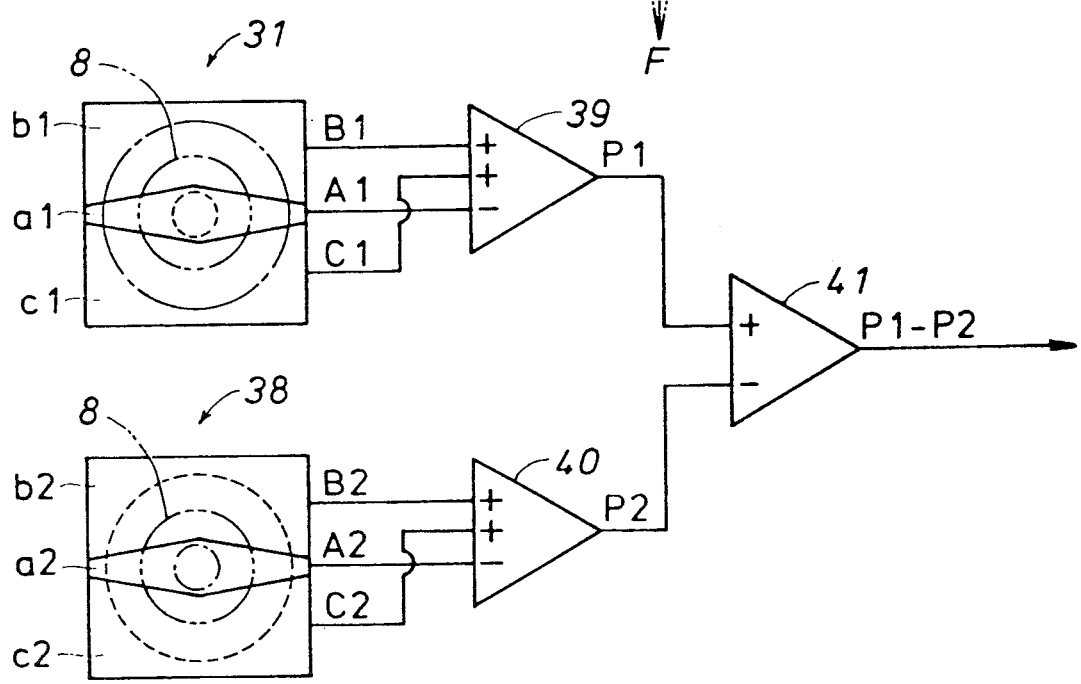
FIG. 7 is a wiring diagram of the detection circuit for the embodiment illustrated in FIG. 6.
Figure 8:
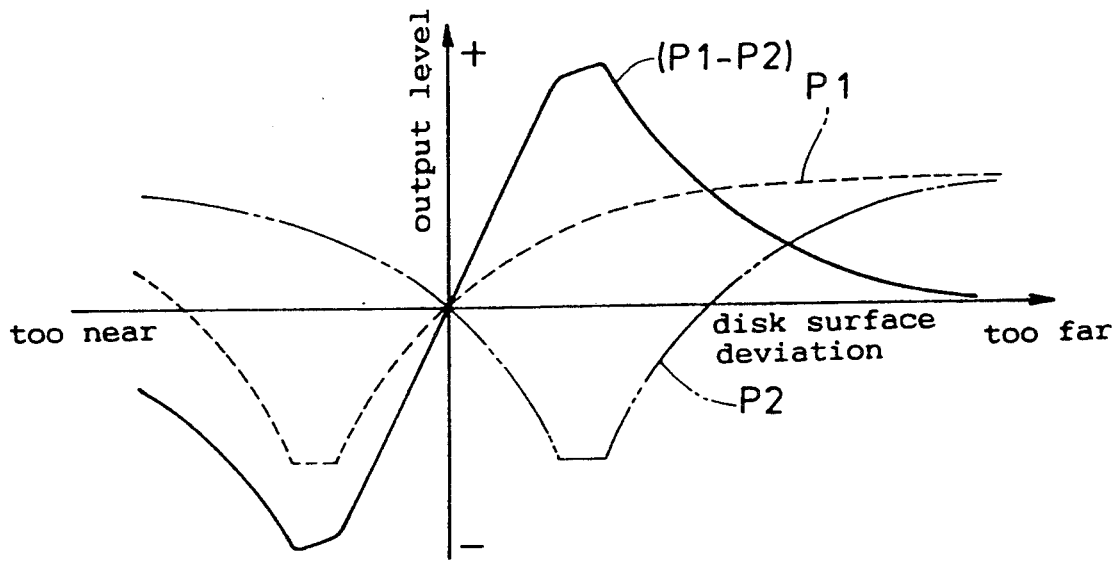
FIG. 8 is a graph showing the relationship between the output and the size of the light beam projected upon the light detecting element according to the embodiment illustrated in FIGS. 6 and 7.

FIGS. 6 through 8 show another embodiment of the optical head structure according to the present invention. This embodiment is similar to the previous embodiment except for that a half prism 34 is interposed in the light beam 30 from the condenser lens 32 to the light detecting element 31. Therefore, a half of the light beam 30 reaches the light detecting element 31 but the other half of the light beam 30 is deflected by 90 degrees by the half prism 34 and is projected upon another identical light detecting element 38. Whereas the first light detecting element 31 is placed slightly ahead of the focal point F (at which the light beam converges into a point when the optical disk 23 is located at its neutral position) whereas the second light detecting element 38 is placed slightly short of the focal point F so that the two light detecting elements 31 and 38 may be located so as to be symmetric relative to the focal points F or, in other words, displaced from the associated focal points by a same distance. It should be understood that the positions of the light detecting elements relative to the focal points F may be reversed without changing the final results.

Referring to FIG. 7, the inverting input of a first amplifier 39 of unit gain is connected to the output of the middle part a1 of the first light detecting element 31, and the non-inverting inputs of the amplifier 39 are connected to the outputs of the outer parts b1 and c1 of the first light detecting element 31. Similarly, the inverting input of a second amplifier 40 of unit gain is connected to the output of the middle part a2 of the second light detecting element 38, and the non-inverting inputs of the amplifier 40 are connected to the outputs of the outer parts b2 and c2 of the second light detecting element 38. The outputs of the first amplifier 39 and the second amplifier 40 are connected to the non-inverting input and the inverting input of a third amplifier 41 of unit gain, respectively. Therefore, in regards to the first light detecting element 31, the output P1 of the first amplifier 39 is given by B1+C1−A1 where A1 is the output from the middle part a1 and B1 and C1 are the outputs from the outer parts b1 and c1. In regards to the second light detecting element 38, the output P2 of the second amplifier 40 is given by B2+C2−A2 where A2 is the output from the middle part a2 and B2 and B2 and C2 are the outputs from the outer parts b2 and c2. The output P1-P2 from the third amplifier 41 gives the difference between the outputs P1 and P2 of the first and the second amplifiers 39 and 40.

Referring to FIG. 8, the broken line and the chain-dot line represents the output levels of the first and second amplifiers 39 and 40, respectively, against the deviation of the optical disk 23 from its neutral position. It should be understood that the deviation of the optical disk 23 from its neutral position in either direction causes opposite changes in the outputs of the first and second light detecting elements 31 and 38. Therefore, the change in the output level P1-P2 from the third amplifier 41 is twice the output level from either one of the first and second amplifiers. Therefore, the present invention offers twice the sensitivity of the previous embodiment.

Further, as can be understood from FIG. 8, the nonlinearities of the outputs of the two light detecting elements 31 and 38 have symmetric tendencies, and are therefore canceled out by each other when they are appropriately combined. Therefore, the present embodiment offers both a high sensitivity and a favorable linear output property. Further, due to symmetric arrangement of the circuitry, stability of the circuit operation against external interferences such as temperature variations can be ensured.

When only one light detecting element is used, the output level crosses the zero-level at two points. Therefore, there is a possibility of confusing the two points depending of the circumstance. However, when the symmetric arrangement illustrated in FIG. 7 is used, the output level crosses the zero level only at one point, and no such confusion can occur and the dynamic range of detection is increased. This is an additional advantage of this embodiment.

Figure 9:
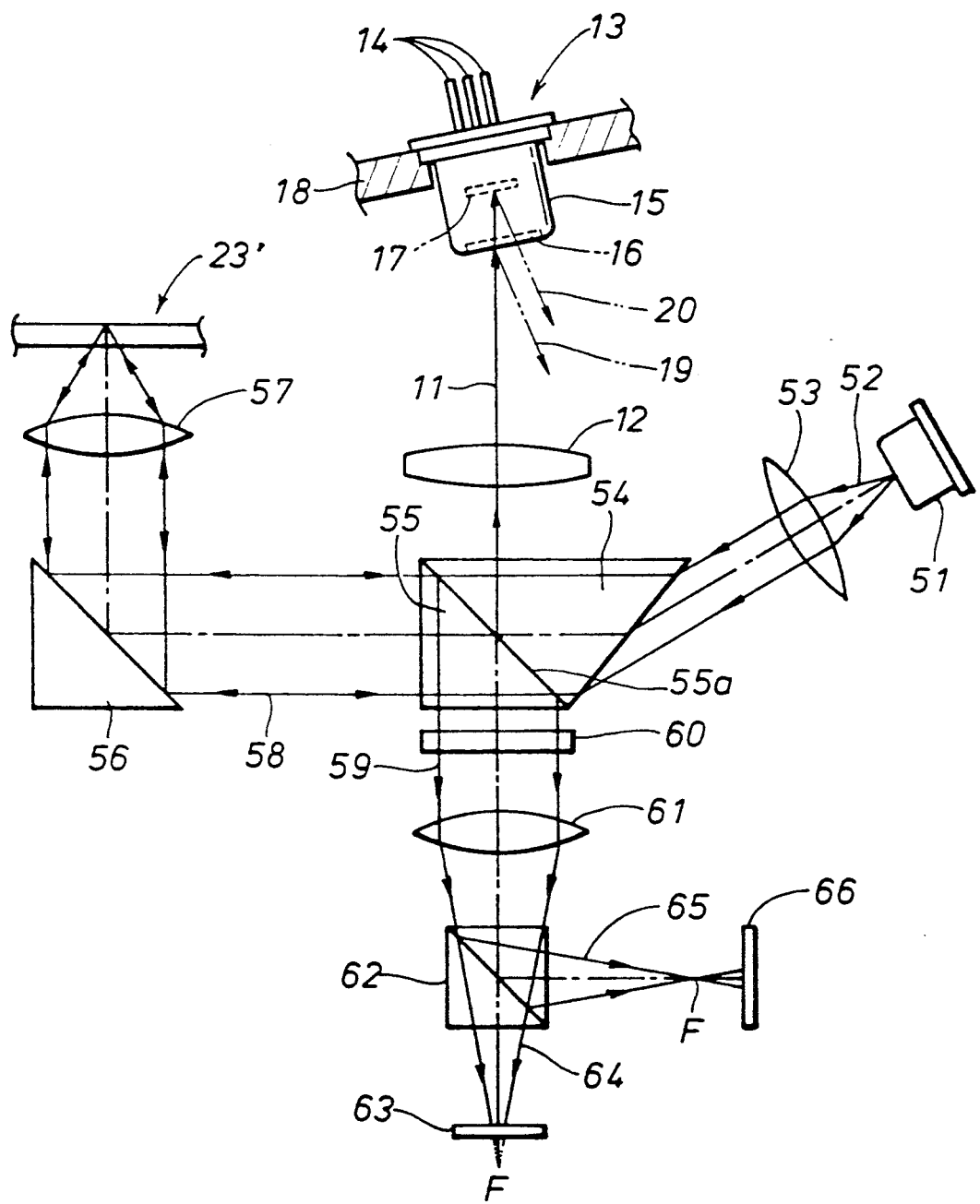
FIG. 9 is a diagram similar to FIG. 1 illustrating a third embodiment of the optical head structure according to the present invention constructed as a optical head for a magnetic optical disk system.
Figure 10:
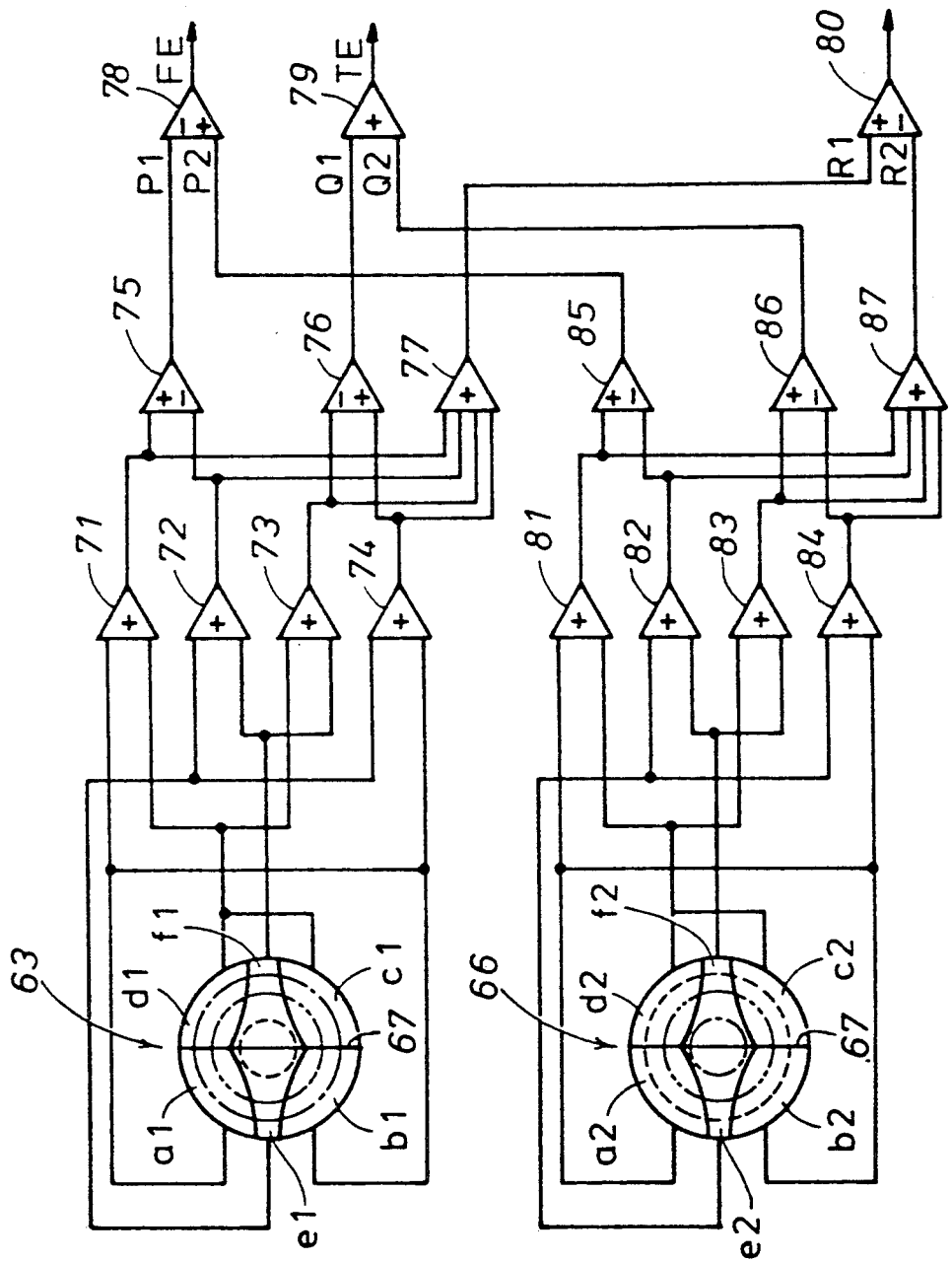
FIG. 10 shows a schematic diagram of the light detecting elements and a circuit diagram of the detection circuit for for the third embodiment illustrated in FIG. 9.

FIGS. 9 and 10 show a third embodiment of the optical head structure according to this invention constructed as a magnetic optical disk system. This embodiment can produce three outputs for focusing error control, tracking error control and data read-out.

Referring to FIG. 9, the light beam 52 projected from a semiconductor laser device 51 as a linearly polarized light beam is converted into a parallel light beam by a collimator lens 53 and is shaped into a light beam having a circular cross section by a shaping prism 54. This light beam 52 is then projected upon the surface of an optical disk 23' illustrated in a left part of the drawing, via a polarized beam splitter 55, a mirror 56 and an object lono 57. The light beam 58 reflected from the optical disk 23' returns to the beam splitter 55 via the mirror 56 and the object lens 57. The polarization beam splitter 55 comprises a polarization film 55a extending at a 45-degree angle relative to the direction of the incident light beam 52. The polarization film 55a has such a property that it transmits 60 to 80% of the P wave but reflects 100% of the S wave which has a polarization angle perpendicular to that of the P wave.

Therefore, a part of the incident light beam 52 projected upon the polarization film 55a as a P wave light beam is reflected by the polarization film 55a and is deflected upward in FIG. 9 or to a monitoring photodiode 13 which is described hereinafter as a light beam 11. The rest of the incident light beam which consists solely of a P wave component is then projected upon the optical disk 23' via the mirror 56 and the object lens 57. Because selected spots on the optical disk 23' are provided with a certain optical polarization property, some of the P wave component of the projected light beam is converted into a S wave component. Therefore, the light beam 58 reflected from the optical disk 23' may contain some S wave component. This S wave component as well as a part of the P wave component of the reflected light beam 58 is deflected by the polarization film 55a downward in FIG. 9 as a light beam 59 or to a half-wave plate 60, a condenser lens 61, and another polarized beam splitter 62.

The polarization plane of the light beam 59 is turned 45 degrees by the half-wave plate 60 and is split by the polarized beam splitter 62 into a light beam 64 consisting of a P wave component and another light beam 65 consisting of a S wave component which are directed in mutually perpendicular directions in regards to their planes of polarization. One of the split light beams 65 is projected upon a first light detecting element 66 which is located slightly ahead of the focal point F of the light beam 65 while the other split light beam 64 is projected upon a second light detecting element 63 which is located slightly short of the focal point F of the light beam 64. It should be noted that the two light detecting elements 63 and 66 are placed at symmetric locations relative to the focal points F of the light beams 64 and 65.

A part of the light beam 52 from the collimator lens 53 is reflected by the polarization film 55a as mentioned above and projected upon the photo-diode 13 via a condenser lens 12. The photo-diode 13 monitors the intensity of the light emitted from the semiconductor laser device 51 to control its level. This location for the monitoring photo-diode 13 is preferred over the interior of the semiconductor laser device 51 because a part of the light projected upon the optical disk 23' is reflected back to the semiconductor laser device 51 through the polarized beam splitter 55 and this causes an error in the detection of the intensity of the light emitted from the semiconductor laser device 51.

Further, according to the present invention, the photo-diode 13 which is packaged in a can 15 is mounted on a support member 18 in such a manner that its axial line defines an oblique angle relative to a light beam 11 projected from the condenser lens 12. Therefore, the projected light 11 is projected upon a light receiving surface 17 of the photo-diode 13 through a glass cover 16 but the light beams 19 and 20 reflected from the glass cover 16 and the light receiving surface 17 are directed away from the path of the projected light beam 11 and are therefore prevented from reaching the light detecting element 63 or 66 as noises through the polarized beam splitter 55. The output from the photo-diode 13 is obtained from its leads 14 and is used for appropriately controlling the intensity of the light produced from the semi-conductor laser device 51.

Referring to FIG. 10, each light detecting element 63 or 66 is divided into six parts by a vertical diametral line 67, and a pair of lateral lines extending laterally from the vertical diametral line 67 in each lateral direction. It should be noted that the light receiving surfaces of the light detecting elements 63 and 66 may be circular, square, rectangular or any arbitrary shape. As shown in this drawing, the lateral lines are convex toward the center of the light detecting element and converges toward each other as they extend away from the vertical diametral line 67. Therefore, the lateral lines define cusps as they meet at the vertical diametral line 67 at lower and upper parts thereof. It should be also noted that the lateral lines are symmetric not only about the vertical diametral line 67 but also about a horizontal diametral line (not shown in the drawing) which is drawn through the center of the light detecting element 63 or 66 perpendicularly to the vertical diametral line 67.

Thus, one of the light detecting elements 63 is divided into 6 parts a1 through f1, and the other light detecting element 66 is also divided into 6 parts a2 through f2. As shown in FIG. 10, the parts a1 and b1 are located in upper and lower parts of a left half of the light receiving surface of the light detecting element 63, and the part e1 is located in a middle part of the left half. The parts d1 and c1 are located in upper and lower parts of a right half of the light receiving surface of the light detecting element 63, and the part f1 is located in a middle part of the right half. The other light detecting element 66 is also divided into six parts a2 through f2 in a similar fashion.

The outputs from the six parts a1 through f1 are connected to four adders 71 through 74 in the following manner: the inputs of the first adder 71 are connected to the parts a1, b1, c1 and d1; the inputs of the second adder 72 are connected to the parts e1 and f1; the inputs of the third adder 73 are connected to the parts c1, d1 and f1; and the inputs of the fourth adder 74 are connected to the parts e1, a1 and b1. The outputs from the six parts a2 through f2 of the other light detecting element 66 are connected to four adders or fifth through eighth adders 81 through 84 in a similar fashion.

The outputs from the four adders 71 through 74 are connected to the inputs of two subtracters 75 and 76 and one adder 77 in the following manner: the inputs of the first subtracter 75 are connected to the outputs of the first and second adders 71 and 72; the inputs of the second subtracter 76 are connected to the outputs of the third and fourth adders 73 and 74; and the inputs of the ninth adder 77 are connected to the outputs of the first through fourth adders 71 through 74. The outputs from the fifth through eighth adders 81 through 84 are similarly connected to a third subtracter 85, a fourth subtracter 86 and a tenth adder 87.

The outputs of the ninth and tenth adders 77 and 87 and the first through fourth subtracters 75, 76, 85 and 86 are connected to the inputs of two subtracters 78 and 80 and one adder 79 in the following manner: the inputs of the fifth subtracter 78 are connected to the outputs of the first subtracter 75 and the third subtracter 85; the inputs of the eleventh adder 79 are connected to the outputs of the second and fourth subtracters 76 and 86; and the inputs of the sixth subtracter 80 are connected to the outputs of the ninth and tenth adders 77 and 87.

Thus, when the output levels of the various parts a1 through f1, and a2 through f2 are represented by A1 through F1, and A2 through F2, the output P1 of the first subtracter 75 which is supplied to the negative input of the fifth subtracter 78 and the output P2 of the third subtracter 85 which is supplied to the positive input of the fifth subtracter 78 are given by $(A1+B1+C1+D1-E1-F1)$ and $(A2+B2+C2+D2-E2-F2)$, respectively. Thus, the output of the fifth subtracter 78 provides an output for focusing error control.

Likewise, the output Q1 of the second subtracter 76 which is supplied to one of the inputs of the eleventh adder 79 and the output Q2 of the fourth subtracter 86 which is supplied to the other input of the eleventh adder 79 are given by $(A1+B1-C1-D1+E1-F1)$ and $(-A2-B2+C2+D2-E2+F2)$, respectively. Thus, the output of the eleventh adder 79 provides an output for tracking error control.

The output R1 of the ninth adder 77 and the output R2 of the tenth adder 87 are given by $(A1+B1+C1+D1+E1+F1)$ and $(A2+B2+C2+D2+E2+F2)$, respectively. Thus, the output of the sixth subtracter 80 provides an output for data read-out.

Figure 11:
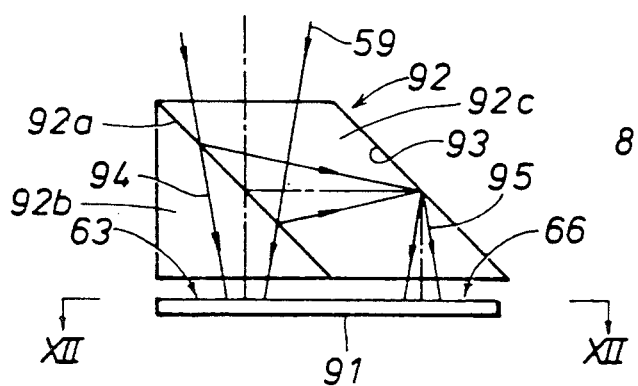
FIG. 11 is a diagram showing an essential part of a fourth embodiment of the optical head structure according to the present invention.
Figure 12:
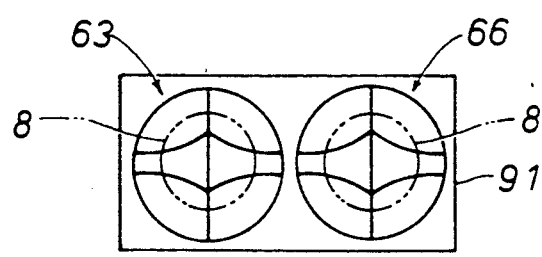
FIG. 12 is an end view as seen from line XII—XII of FIG. 11.

FIGS. 11 and 12 show a modified embodiment similar to the embodiment illustrated in FIGS. 9 and 10. According to this embodiment, the light beam 59 which has passed the condenser lens 61 is split into two parallel beams 94 and 95 consisting of P wave and S wave components, respectively, by a polarized beam splitter 92 consisting of a pair of prisms 92c and 92b which are parallelepiped and triangular in cross section, respectively. A polarization film 92a is interposed between the interface therebetween. The incident light beam 59 entering from the upper end of the parallelepiped prism 92c is projected upon this interface at a 45-degree angle, and the P wave light beam 94 directly passes through into the triangular prism 92b to be directly projected upon one of a pair of light detecting elements 63 while the S wave light beam 95 is reflected laterally from the interface (the polarization film 92a) and the opposing side of the parallelepiped prism 92c to be projected upon the other light detecting element 66 which is provided right next to the first-mentioned light detecting element on a common plane.

This embodiment offers the advantage of compactness and simplicity because the two light detecting elements 63 and 66 may be disposed on a common plane, one next to the other, in a single package 91.

Figure 13:
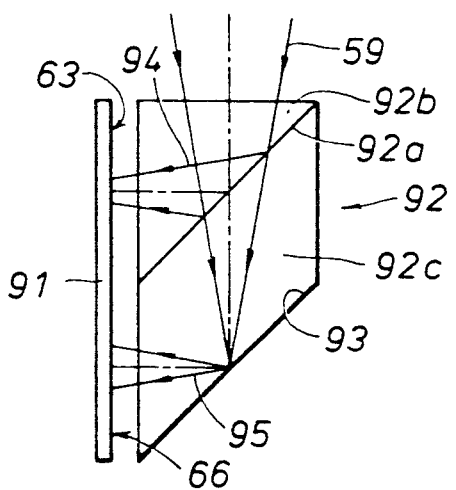
FIG. 13 is a view similar to FIG. 11 showing an essential part of a fourth embodiment of the optical head structure according to the present invention.

According to another modified embodiment illustrated in FIG. 13 in which the parts corresponding to those of the previous embodiments are denoted with like numerals, an identical polarized beam splitter 92 is used, but the incident light beam 59 is projected from a side of the triangular prism 92b. The S wave part of the incident light beam or the light beam 95 is reflected by the polarization film 92a interposed between the triangular prism 92b and the parallelepiped prism 92c to be projected upon one of the light detecting elements 63. The P wave component of the incident light beam or the light beam 94 passes through the polarization film 92a and is reflected by the opposing side of the parallelepiped prism 92c to be projected upon the other light detecting element 66. This embodiment offers similar advantages as the previously described modified embodiment.

Figure 14:
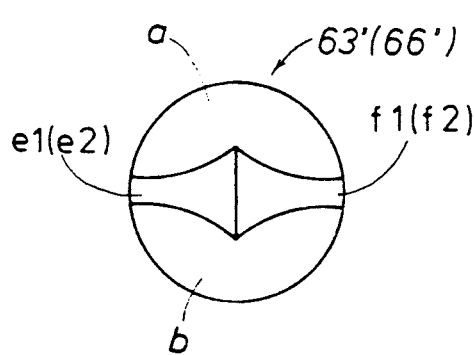
FIG. 14 is a view similar to FIGS. 4 and 5 illustrating an alternate embodiment of the light receiving element according to the present invention.

FIG. 14 illustrates a modified embodiment of the light detecting element 63' (66'). In this embodiment, the parts a1 and d1 (a2 and d2) are combined into a common part a, and the parts b1 and c1 (b2 and c2) are likewise combined into a common part b. Therefore, according to this embodiment, the first through eighth adders 71 through 74, and 81 through 84 can be omitted for producing the outputs for focusing error control, tracking error control and data read-out. In this case, the tracking error output is derived as (E1−F1)+(E2−F2) where E1, E2, F1 and F2 are outputs from the parts e1, e2, f1 and f2, but the other outputs are derived in the same way as in the previous embodiment.

Figure 15:
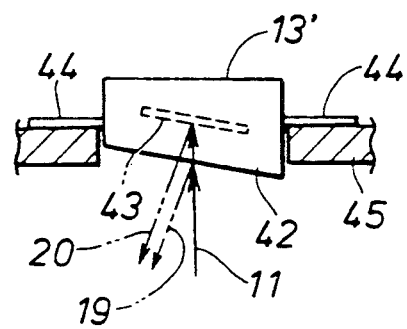
FIG. 15 is a sectional view showing a second embodiment of the light amplitude detector.

FIG. 15 shows another embodiment of the photoelectric device for monitoring the intensity of the light emitted from the semiconductor laser device 51. This photoelectric device consists of a photo-diode 13' packaged in a plastic mold package which is mounted on a support member 45 by way of brackets 44. In this embodiment also, the transparent casing surface 42 through which the light is projected, as well as the light receiving surface 43 of the photo-diode 13', is inclined with respect to a plane perpendicular to the path of the projected light 11 so that the light beams 19 and 20 reflected from the casing surface 42 and the light receiving surface 43 are directed away from the path leading to the polarized beam splitter 55 and the light detecting elements 63 and 66.

Figure 16:
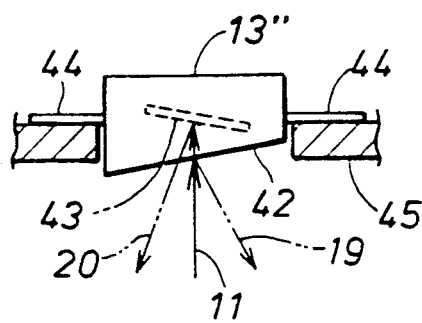
FIG. 16 is a view similar to FIG. 15 showing a third embodiment of the light amplitude detector.

A plastic mold package can be configured into any desired shape. According to the embodiment illustrated in FIG. 16, the light receiving surface 43 and the casing surface 42 of a photo-diode 13" are inclined in two different directions. This photo-diode 13" can offer the same benefits as the previous embodiment.

Figure 17:
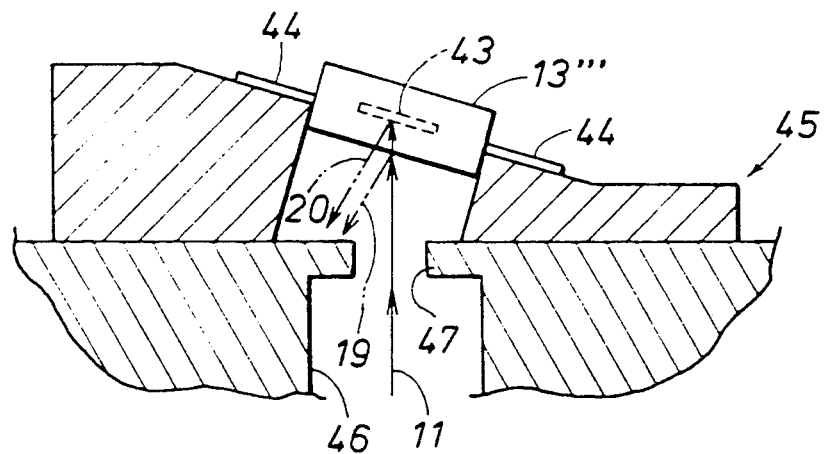
FIG. 17 is a view similar to FIG. 15 showing a fourth embodiment of the light amplitude detector.

FIG. 17 shows a fourth embodiment of the photoelectric device for monitoring the intensity of the light emitted from the semiconductor laser device 51. According to this embodiment, a normal photo-diode 13''' is mounted on a support member 45 in an oblique fashion in similar manner as in the embodiment illustrated in FIG. 9. The support member 45 is further provided with a bore 46 for guiding the light into the photo-diode 13''', and a radially inwardly directed flange 47 provided in this bore 46 for shielding the light beams 19 and 20 reflected from the photo-diode 13''' from reaching the light detecting elements 63 and 66.

Figure 18:
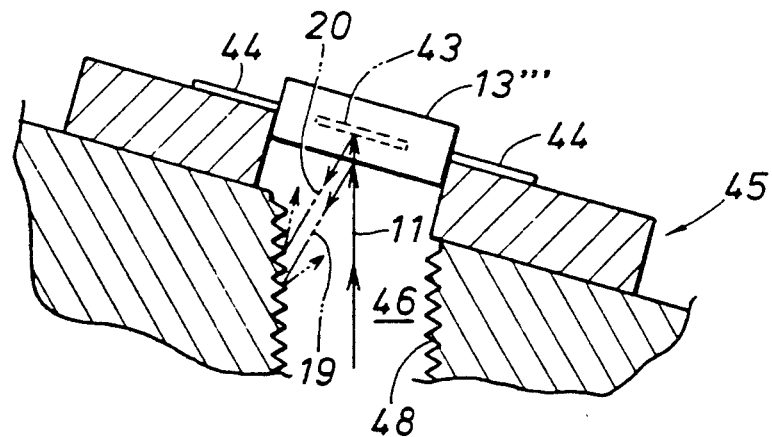
FIG. 18 is a view similar to FIG. 15 showing a fifth embodiment of the light amplitude detector.

The fifth embodiment illustrated in FIG. 18 is similar to the previous embodiment in that the photodiode 13''' is obliquely mounted on a support member 45 and the support member 45 is provided with a bore 46 for guiding the light beam 11 directed to the photodiode 13''' but differs from the previous embodiment in having a non-reflective surface 48, instead of the flange 47, on the inner circumferential surface of the bore 46. The non-reflective surface 48 may be a smooth surface coated with a suitable non-reflective substance or a irregular surface which can effectively prevent the light beams 19 and 20 reflected from the photodiode 13''' from traveling back to the polarized beam splitter 55.

Although the present invention has been shown and described with respect to detailed embodiments, it should be understood by those skilled in the art that various changes and omission in form and detail may be made therein without departing from the spirit or scope of this invention.

What we claim is:

1. An optical head structure, comprising:
   a light source;
   an optical system for projecting a first light beam from said light source upon an optical data recording medium and guiding a second light beam produced from said optical data recording medium as a result of projecting said first light beam, as a converging light beam;
   a light detecting element having a photoelectric surface area divided into at least three surface parts, consisting of a central band part extending centrally and diametrically across said surface area and a pair of adjoining outer parts which are arranged on either side of said central band part, to receive said second light beam at a position in a path of said second light beam slightly displaced from a focal point of said second light beam;
   a subtractor for producing a difference between an output from said central bank part and a sum of outputs of said adjoining parts; and
   said central band part being progressively narrower as it extends in each direction away from a central part of said photoelectric surface area.

2. An optical head structure according to claim 1, wherein said central band part is defined by straight lines.

3. An optical head structure according to claim 1, wherein said central band part is defined by lines which are concave towards a central part of said central band part.

4. An optical head structure according to claim 1, wherein said central band part is defined by lines which are convex towards a central part of said central band part.

5. An optical head structure according to claim 1, wherein said photoelectric surface area of said light detecting element is divided into six parts by a central diametral line extending centrally across said central band part and said adjoining parts so as to divide each of them into equal parts, and a subtractor is connected to said six parts so as to produce a difference between outputs from the parts on one side of said central diametral line and the other parts on the other side of said central diametral line.

6. An optical head structure according to claim 5, further comprising an adder for adding the outputs from said six parts of said photoelectric surface area of said light detecting element to produce a data read-out output.

7. An optical head structure according to claim 1, wherein said central band part of said photoelectric surface area of said light detecting element is divided into two equal parts by a central diametral line extending centrally across said central band part, and a subtracter is connected to said two equal parts of said central band part so as to produce a difference between outputs from one of said equal parts on one side of said central diametral line and the other equal part on the other side of said central diametral line.

8. An optical head structure according to claim 7, further comprising an adder for adding the outputs from said equal parts of said central part and said outer parts of said photoelectric surface area of said light detecting element to produce a data read-out output.

9. An optical head structure according to claim 1, wherein said optical system comprises means for producing a light monitoring output for monitoring the intensity of said first beam, and monitoring means for monitoring said light monitoring output, said monitoring means being provided with an input surface which is inclined relative to a plane perpendicular to the line of the path of said light monitoring output.

10. An optical head structure according to claim 1, wherein said optical system is provided with means for splitting said second light beam into a pair of split light beams, and a pair of optical detecting elements are disposed in respective positions in the paths of said split light beams split from said second light beam which are short of and ahead of associated focal points of said split light beams, respectively, by a same distance.

* * * * *